United States Patent [19]

Goodman et al.

[11] 4,081,620

[45] Mar. 28, 1978

[54] SIDETONE CONTROL CIRCUIT FOR A TELEPHONE SET

[75] Inventors: David Joel Goodman, Summit; James David Johnston, N. Plainfield; A. Michael Noll, Stirling, all of N.J.

[73] Assignee: Bell Telephone Laboratories, Incorporated, Murray Hill, N.J.

[21] Appl. No.: 798,786

[22] Filed: May 20, 1977

[51] Int. Cl.² .............................................. H04M 1/58
[52] U.S. Cl. ............................... 179/81 A; 179/1 VL
[58] Field of Search ............... 179/81 A, 81 B, 1 HF, 179/1 VC, 1 VL, 170.2, 170.8, 170 NC

[56] References Cited

U.S. PATENT DOCUMENTS

| | | | |
|---|---|---|---|
| 2,762,867 | 9/1956 | Meacham | 179/81 A |
| 3,170,043 | 2/1965 | Hohmann | 179/81 A |
| 3,440,367 | 4/1969 | Holtz | 179/170 NC |
| 3,546,395 | 12/1970 | Schuh | 179/81 A |
| 3,602,648 | 8/1971 | Holtz | 179/81 A |

Primary Examiner—Kathleen H. Claffy
Assistant Examiner—Joseph A. Popek
Attorney, Agent, or Firm—H. L. Logan

[57] ABSTRACT

A controllable-gain amplifier is connected between the transmitter and receiver of a telephone set and is controlled in response to the level of the telephone user's speech so as to provide an increase in gain when the user speaks too loud and a decrease in gain when the user speaks too low. This results in a sidetone which causes the user to change his or her voice level to obtain an acceptable level of sidetone. A better-controlled user voice level is thus achieved.

6 Claims, 2 Drawing Figures

SIDETONE CONTROL CIRCUIT FOR A TELEPHONE SET

BACKGROUND OF THE INVENTION

1. Field of the Invention

This invention relates to arrangements for controlling sidetone in telephone sets.

2. Description of the Prior Art

Sidetone in a two-wire telephone set is the speech or other signals heard in the set's receiver in response to speech or other signals being impressed on the set's transmitter. It is known that an excessive sidetone level causes a speaker to lower his or her voice level while a low sidetone level causes a speaker to raise his or her voice level. It is also known that three-port hybrid circuits can be used to achieve antisidetone. Furthermore, it is known that these circuits can be modified to provide a small but fixed percentage of sidetone coupling between transmitter and receiver, where the coupling is sufficient to cause the average telephone user to speak at a desired level. Telephone users, however, are not identical, and consequently there still are users who speak too loud or too low.

SUMMARY OF THE INVENTION

An object of the invention is to cause a greater percentage of telephone users to talk at a level closer to a preferred level.

This and other objects of the invention are achieved by providing sidetone through the use of a controllable-gain amplifier connected between the transmitter and receiver of a telephone set. In accordance with the invention, the level of the input to the transmitter is used to control the gain introduced by the amplifier so that the gain is increased for inputs greater than desired and decreased for inputs less than desired. Greater-than-desired inputs therefore increase sidetone coupling so that the sidetone heard by the speaker is much greater than that normally heard, thereby causing the speaker to lower his or her speaking level. On the other hand, less-than-desired speech-level inputs decrease sidetone coupling so that the sidetone heard by the speaker is much less than that normally heard, thereby causing the speaker to raise his or her speaking level.

DETAILED DESCRIPTION

Figure 1:
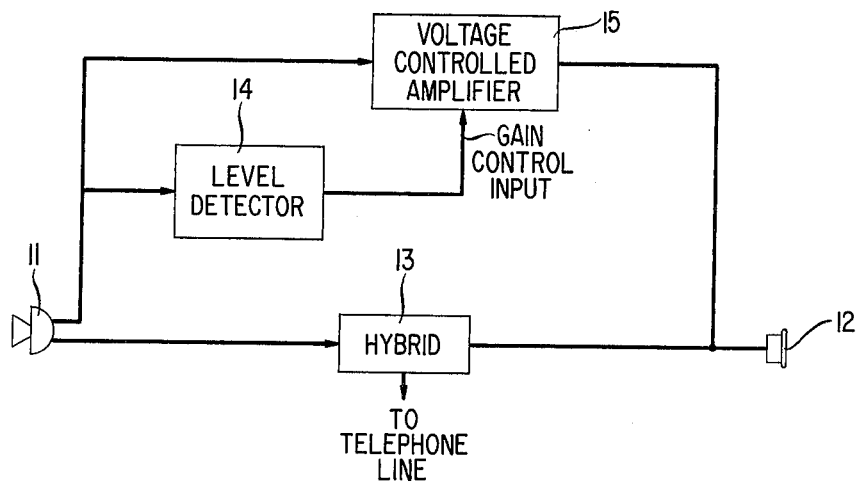
FIG. 1 discloses a block diagram of one embodiment of the invention.

FIG. 1 discloses a block diagram of an embodiment of the invention in which a telephone transmitter 11 and receiver 12 are connected to a telephone hybrid circuit 13 which functions in a true antisidetone manner so that a sidetone is not heard in receiver 12. Transmitter 11 is also connected to a level detector 14 and a voltage-controlled amplifier 15. Detector 14 produces an output voltage which is related to the level of the output of transmitter 11. The output voltage of detector 14 is applied to a gain control input on amplifier 15 so that the gain of the amplifier increases monotonically with the level of the output of transmitter 11. The output of amplifier 15 is applied to receiver 12.

With respect to incoming signals, hybrid circuit 13 applies such signals in the normal manner to receiver 12.

With respect to signals (voice or otherwise) imposed on transmitter 11, a sidetone is applied to receiver 12 via amplifier 15 instead of hybrid circuit 13. Furthermore, the level of the sidetone is a product of the output signal of transmitter 11 (i.e., the input signal to amplifier 15) and the gain of amplifier 15.

Amplifier 15 and detector 14 are selected and adjusted so that desired-level speech impinging on transmitter 11 produces normal-level sidetone in receiver 12. A greater-than-desired-level speech input causes the output of detector 14 to increase, which causes the gain of amplifier 15 to increase, thereby producing a much greater-than-normal increase in the level of the sidetone in receiver 12. In response to this much greater-than-normal increase in sidetone level, the speaker has a tendency to lower his or her voice with the net result that the speech input approximates the desired level. On the other hand, a less-than-desired-level speech input decreases the gain of amplifier 15 and a much less-than-normal sidetone level occurs. In response to this much less-than-normal sidetone level, the speaker has a tendency to raise his or her voice level toward the desired level. In summary, the speaker tends to raise or lower his or her voice level to achieve a more acceptable sidetone, which results in a speech input level approximating that of the desired level.

Figure 2:
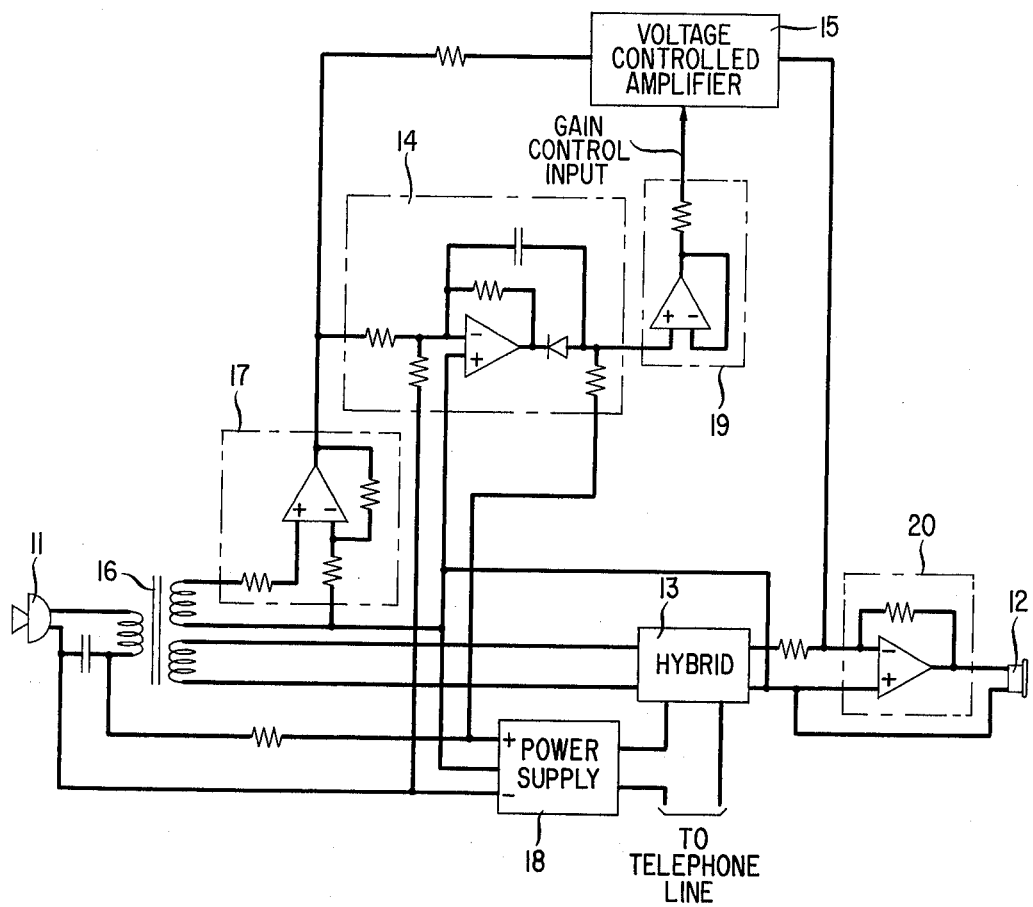
FIG. 2 discloses in greater detail the embodiment shown in FIG. 1.

FIG. 2 shows in greater detail the embodiment disclosed in FIG. 1. In FIG. 2, the output of transmitter 11 is coupled via a transformer 16 to hybrid circuit 13 and a conventional buffer amplifier 17. The output of amplifier 17 is applied to level detector 14 and voltage-controlled amplifier 15. Detector 14 comprises an operational-amplifier nolinear integrating circuit having a fast attack and a slow decay characteristic. In the absence of any input to detector 14, its output is a d.c. voltage whose level is determined by the output of a power supply 18 (which derives its input from the telephone line) and a resistor voltage dividing arrangement within detector 14.

The output voltage of detector 14 is applied to voltage-controlled amplifier 15 by way of a conventional high impedance buffer amplifier 19. Voltage-controlled amplifier 15 is of a conventional nature and may comprise a commercially available integrated circuit. Its output and the output of the receiver port of hybrid circuit 13 are applied to a conventional current amplifier 20 which drives receiver 12.

In some uses it may be preferred to insert a sampling circuit between detector 14 and the control input of amplifier 15. This sampling circuit would continuously sample the detector output voltage and would apply in a continuous manner to amplifier 15 the last sample taken prior to a cessation of speech. By such an addition, the gain setting is partially set when speech again takes place.

Embodiments of the invention may also be used to force a user to talk louder than normal when talking into a lossier-than-normal loop. In such an application, the controllable-gain range of amplifier 15 is changed in response to an indication of a lossier loop so that the user is forced to speak louder in order to receive a normal-level sidetone.

What is claimed is:

1. In a telephone set having a transmitter and a receiver, an improvement CHARACTERIZED IN THAT sidetone coupling means are connected between said transmitter and said receiver wherein said sidetone coupling means comprises a controllable-gain circuit having an input port, an output port and a gain control port, first means connecting said input port to said transmitter, second means connecting said output port to said receiver, and third means connecting said control port to said transmitter to increase the gain of said circuit as a monotonically increasing function of the output level of said transmitter.

2. A telephone set in accordance with claim 1 in which said third means comprises an input-level detector.

3. In a telephone set having a transmitter, a receiver and a hybrid arrangement connected between said transmitter and receiver, an improvement CHARACTERIZED IN THAT said hybrid arrangement provides substantially undetectable sidetone coupling between said transmitter and said receiver, a controllable-gain circuit having an input port, an output port and a gain control port is provided, first means are connected between said input port and said transmitter, second means are connected between said output port and said receiver, and third means are connected between said control port and said transmitter to increase the gain of said circuit as a monotonically increasing function of the output level of said transmitter.

4. A telephone set in accordance with claim 3 in which said third means comprises an input-level detector.

5. A telephone set comprising a transmitter, a receiver, a hybrid arrangement having a transmitting port, a receiving port and a telephone line port wherein coupling between said transmitting and receiving ports results in an undetectable sidetone when connected between said transmitter and receiver, a controllable-gain circuit having an input port, an output port and a gain control port, first means connecting said transmitter to said hybrid arrangement transmitting port and said controllable gain circuit input port, second means connecting said receiver to said hybrid arrangement receiving port and said controllable gain circuit output port, and third means connected between said first means and said controllable gain circuit gain control port to increase the gain of said circuit as a monotonically increasing function of the output level of said transmitter.

6. A telephone set in accordance with claim 5 in which said third means comprises an input-level detector.

* * * * *